(12) United States Patent
Wang

(10) Patent No.: US 6,899,205 B2
(45) Date of Patent: May 31, 2005

(54) BRAKE ASSEMBLY

(75) Inventor: Nui Wang, Croydon (AU)

(73) Assignee: PBR Austrailia Pty Ltd, East Bentleigh (AU)

( * ) Notice: Subject to any disclaimer, the term of this patent is extended or adjusted under 35 U.S.C. 154(b) by 0 days.

(21) Appl. No.: 10/194,404

(22) Filed: Jul. 11, 2002

(65) Prior Publication Data
US 2003/0029682 A1 Feb. 13, 2003

Related U.S. Application Data

(63) Continuation of application No. PCT/AU00/01606, filed on Dec. 29, 2000.

(30) Foreign Application Priority Data

Jan. 11, 2000 (AU) .............................. PQ5040

(51) Int. Cl.⁷ ............................................... F16D 69/00
(52) U.S. Cl. .................. 188/250 H; 188/333; 188/335; 188/250 F; 188/336
(58) Field of Search ................................ 188/333, 335, 188/250 F, 250 H, 340, 341, 78, 328, 336

(56) References Cited

U.S. PATENT DOCUMENTS

| | | | |
|---|---|---|---|
| 1,846,024 A | * 2/1932 | Chase et al. ............... | 188/336 |
| 2,032,864 A | 3/1936 | Begg et al. .................... | 51/105 |
| 2,068,959 A | * 1/1937 | McConkey .................. | 188/324 |
| 2,102,915 A | 12/1937 | Rischel .......................... | 51/96 |
| 2,166,754 A | 7/1939 | Dick ........................... | 188/78 |
| 2,167,935 A | 8/1939 | Borden ........................ | 188/78 |
| 2,174,243 A | 9/1939 | Hawley ....................... | 188/78 |
| 2,206,742 A | 7/1940 | Dodge ......................... | 188/78 |
| 2,215,547 A | 9/1940 | Dick ........................... | 188/79.5 |
| 2,236,345 A | 3/1941 | Mossinghoff ................ | 188/78 |
| 2,273,223 A | 2/1942 | Sawtelle ...................... | 188/152 |
| 2,293,710 A | 8/1942 | Cadman ....................... | 188/78 |
| 2,330,879 A | 10/1943 | Forbes ......................... | 188/78 |
| 2,596,379 A | 5/1952 | Dodge ......................... | 188/79.5 |
| 2,768,714 A | 10/1956 | Holdeman et al. .......... | 188/259 |
| 3,386,535 A | 6/1968 | Bishop et al. ................ | 188/77 |
| 3,412,835 A | 11/1968 | Goldberg ..................... | 192/107 |
| 3,835,964 A | * 9/1974 | Margetts .................... | 188/79.63 |
| 3,999,633 A | 12/1976 | Prouhet ........................ | 188/64 |
| 4,024,933 A | 5/1977 | Hinderks .................... | 188/77 R |
| 4,053,287 A | * 10/1977 | Delves ........................ | 451/226 |
| 4,452,346 A | 6/1984 | Stukenborg .............. | 188/250 G |
| 4,456,100 A | 6/1984 | Manaki ..................... | 188/77 R |
| 5,246,093 A | * 9/1993 | Wang ......................... | 188/336 |

FOREIGN PATENT DOCUMENTS

| | | | | |
|---|---|---|---|---|
| DE | 3941400 | * | 6/1991 | ............. 188/250 H |
| FR | 1361516 | * | 4/1964 | ............. 188/250 H |
| GB | 1053617 | | 1/1967 | |
| GB | 1090058 | | 11/1967 | ........... F16D/51/04 |
| WO | WO-99/53212 | | 10/1999 | ........... F16D/65/08 |
| WO | WO 99/53212 | * | 10/1999 | ............. 188/250 H |

* cited by examiner

Primary Examiner—Robert A. Siconolfi
Assistant Examiner—Devon Kramer
(74) Attorney, Agent, or Firm—Schwegman, Lundberg, Woessner & Kluth, P.A.

(57) ABSTRACT

A drum brake assembly including a rotatable drum having a radially inner braking surface and a brake shoe of single piece construction and of generally circular form mounted within the drum against a backing plate. The brake shoe has a radially outer face and a friction lining mounted thereon in facing relationship to the radially inner braking surface. Actuator having actuated brake on and released brake off conditions and being operable in the actuated condition to diametrically expand the brake shoe is provided. Positioners are also provided for positioning the brake shoe within the drum when the actuator is in the brake off condition to provide for complete clearance between the outer face of the friction lining and the inner braking surface of the drum. A grinding jig for grinding friction lining is also provided. A brake assembly having a connector for connecting the brake shoe to the backing plate.

17 Claims, 4 Drawing Sheets

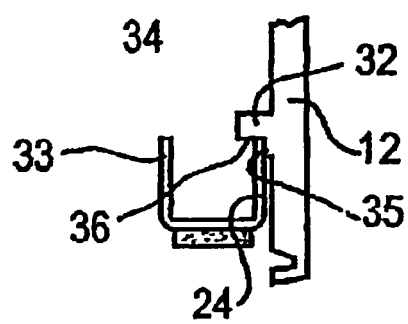 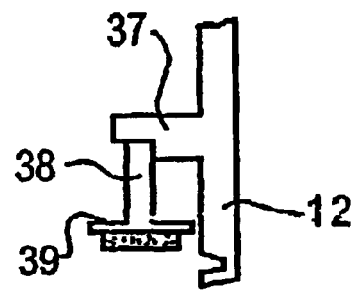
FIG 6    FIG 6a
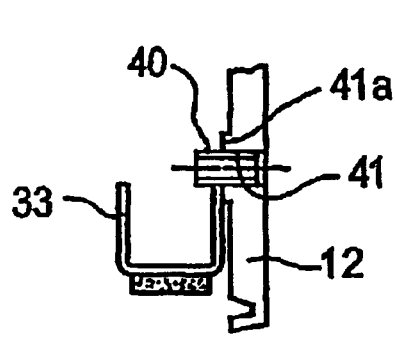 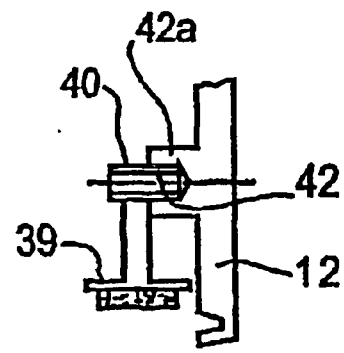
FIG 7    FIG 8
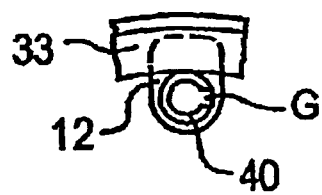
FIG 9

BRAKE ASSEMBLY

RELATED APPLICATIONS

This application is a continuation under 35 U.S.C. 111(a) from International Application No PCT/AU00/01606 filed Dec. 29, 2000 and published in English as WO 01/51824 A1 on Jul. 19, 2001, which claims priority under 35 USC 119 from Australian Patent Application No. PQ 5040 filed Jan. 11, 2000, which applications and publication are incorporated herein by reference.

BACKGROUND OF THE INVENTION

The present invention relates to an improved brake assembly for use in drum brakes. The invention particularly relates to a type of brake assembly that employs a single piece shoe of generally circular configuration and such an assembly is disclosed in Applicant's co-pending International Application No. PCT/AU99/00248 (WO 99/53212) and in applicant's U.S. Pat. No. 5,246,093.

FIELD OF THE INVENTION

The brake assemblies having brake shoes of single-piece construction are considered to provide various advantages over previous assemblies, particularly because they include a reduced number of parts. That is because in brake assemblies which employ single piece shoes, the shoes are mounted to float within the drum, and therefore do not require significant restraint componentry. However, external forces such as excessive vibration and axle deflection can cause the shoe to shift over the backing plate and that can cause the brake shoes to become misaligned when the assembly is in a "brake off" condition, or in other words, when there is no brake actuating load being applied. In some circumstances, that misalignment may cause the brake shoe to engage the drum braking surface in the "brake off" condition which is undesirable.

SUMMARY OF THE INVENTION

It is an object of the invention to provide an improved brake assembly in which the brake shoe is more reliably returned to a position spaced from contact with the drum braking surface in the brake off condition.

According to the present invention there is provided a drum brake assembly including a rotatable drum having a radially inner braking surface and a brake shoe of single piece construction and of generally circular form mounted within said drum against a backing plate, said brake shoe having a radially outer face and friction lining mounted thereon in facing relationship to said radially inner braking surface, actuating means having actuated brake on and released brake off conditions and being operable in said actuated condition to diametrically expand said brake shoe, and positioning means for positioning said brake shoe within said drum when said actuating means is in said brake off condition to provide for complete clearance between the outer face of said friction lining and said inner braking surface.

In a preferred arrangement, the positioning means centrally positions the brake shoe relative to the axis of rotation of the drum to provide for relatively uniform clearance between the friction lining and the drum braking surface, at least when the friction lining is substantially unworn. As the lining wears, the clearance may differ between the leading and trailing brake linings, although in a brake assembly in which the brake shoe operates only as a parking brake, such wear is generally negligible and therefore the clearance will remain substantially the same over time. Alternatively, the positioning means may position the brake shoe eccentrically with respect to the axis of rotation of the drum but still maintain appropriate lining clearance and that eccentric positioning may be desirable if different thicknesses of friction lining are applied to opposite sections of the brake shoe, or if the friction lining is known to wear in a manner in which eccentric positioning minimises or compensates for that wear.

A single piece brake shoe can be formed to have a resilience against expansion under brake actuation, so that it radially retracts upon removal of the brake actuating load, to withdraw the friction lining from braking engagement with the drum braking surface. In relation to such a shoe, the positioning means of the present invention can cooperate with the brake shoe to position it in the manner described above, without requiring additional brake shoe retracting means. However, retracting means may nevertheless be provided to assist return of the brake shoe from the brake actuated position if necessary.

In one preferred form of the invention, the positioning means includes abutment means which abut an internal face or edge of the brake shoe in the brake off position. The abutment means is positioned so that engagement thereof by the brake shoe occurs only in the retracted brake off condition and with the brake shoe positioned so that a suitable clearance exists between the friction lining of the brake shoe and the drum braking surface. In this form of the invention, the abutment means may include at least a pair of abutments which are spaced apart to engage spaced apart or opposite faces of the brake shoe, preferably symmetrically about a centre-line that extends between opposed ends of the shoe.

Engagement of the brake shoe with the pair of abutments may position the brake shoe as required, although in a further preferred arrangement, the abutment means includes biasing means to bias and return the shoe against the abutments when a brake actuating force is removed. The biasing means may take any suitable form and in one form it extends in connection between the brake shoe and the backing plate of the brake assembly. The biasing means may act in tension or compression to bias the brake shoe into engagement with the abutments and in one form, the biasing means includes a coil spring that extends in tension between the brake shoe and the backing plate and the connection of the spring to the brake shoe is preferably along the aforementioned centre-line. That connection could however be spaced from the shoe centre-line, particularly if the spring would interfere with other features of the brake assembly in that position.

In an alternative arrangement, the biasing means takes the form of a leaf or cantilever spring which can be fixed to either of the backing plate or the brake shoe, to bear against the other. In that arrangement, the leaf spring may act in tension or compression. Preferably the leaf spring is fixed to the backing plate and bears against the internal edge or face of the brake shoe.

The abutment means preferably extends in connection with the backing plate and may be formed integrally therewith, or may be fixed thereto. Thus, the abutments may be formed as cast protrusions if the backing plate is cast, or they may be separately formed and attached to the backing plate such as by welding or screw threaded engagement. Each abutment may be solid or rigid, although in a preferred arrangement, the abutments can resiliently distort under a significant impact load and resultant axle deflection, such as may be applied by the brake shoe to the abutments if a wheel to which the brake assembly is fitted receives an impact load. If the abutments are rigidly formed, then such an impact load may permanently distort the brake shoe, or one or more of the abutments and that would affect the brake off position of the brake shoe within the drum. In one form of this arrangement, the abutments may be formed in a tubular manner, with a longitudinal gap extending the full lengthwise extent of the abutment. In this arrangement, the abutment may be fixed to the backing plate so that it extends from the backing plate with its longitudinal axis substantially transverse to the general plane of the backing plate and with the gap positioned to enable resilient compression of the abutment under load by closure of the longitudinal gap. That closure occurs only for the period of the impact loading and the resilient nature of the abutment causes the gap to reopen, or in other words, the abutment to recover, when the impact loading or axle deflection is removed. The preload of the resilient abutments preferably substantially exceeds the load of the biasing means, so that under the biasing load alone, there is no compression of the abutments. Thus, in this arrangement, the positioning means can continue to maintain the brake shoe in the correct position even following impact loads that may otherwise have caused abutment distortion.

The present invention further provides apparatus for and a method of preparing a lined "brake-shoe" of generally circular, single piece construction, by mounting the brake shoe on supporting means that includes positioning means to position the shoe as if it were positioned against a backing plate that employed such positioning means. The supporting means thus simulates the mounted arrangement of a brake shoe against a backing plate and the friction lining can then be treated, such as by surface grinding to suit the particular brake drum to which the brake shoe is to be fitted.

In the above method, the supporting means may further include abutment means fitted between opposed ends of the brake shoe to prevent collapse of the shoe under grinding pressure, or to expand the shoe radially to simulate the "brake on" or as installed condition of the brake shoe in order that the lining can be ground to the correct drum braking surface profile. The method may include other steps in the formation of a lined brake shoe, such as attaching the lining to the shoe platform and such attachment may conveniently occur when the shoe is supported on the supporting means against the positioning means.

In the above apparatus and method, the construction of the supporting means in a substantially identical manner to a backing plate employing positioning means is important, to ensure that the brake shoe which is formed by that method and apparatus will, in use, have the desired clearance between the friction lining and the drum braking surface in the brake off condition. In other words, the geometry of the supporting means should accurately mirror an actual backing plate/positioning means arrangement of a brake assembly. With this preference for accuracy, it is preferred that in brake assemblies which employ cast backing plates, the central spigot opening of the backing plate be accurately machined, and that the center of the spigot opening be used as a datum point for the construction of the supporting means.

In a second embodiment of the invention, the positioning means includes connection means that connects the brake shoe to the backing plate and which permits the brake shoe movement both radially and circumferentially relative to the backing plate but returns the brake shoe from any such movement upon removal of a brake actuating load. A brake assembly according to this arrangement advantageously permits a single piece construction of the brake shoe and backing plate, and further permits desirable movement of the shoe relative to the backing plate during brake actuation. The connection is somewhat forgiving in its manner of operation, by permitting the shoe to move under brake actuation to the most appropriate braking position, although the connection means can also be arranged to limit the available movement as desirable.

A brake shoe according to the second embodiment preferably defines a pair of substantially rigid brake shoe portions disposed in facing relationship and each having a T-shaped cross-sectional form along at least a major portion of its length, and each defining an outer radial surface for supporting friction lining. The shoe portions are preferably spaced apart at one end thereof, with the connection means disposed at or adjacent the opposite ends of those portions.

The connecting means can take any form suitable to permit the brake shoe radial and circumferential movement relative to the backing plate during brake actuation . In one arrangement, a pair of connecting elements extends between the brake shoe and the backing plate. In this arrangement, the connecting elements are preferably spaced apart circumferentially preferably about the shoe centre-line described earlier. In a particularly preferred arrangement, a respective connecting element is disposed at or adjacent each of the ends of each of the shoe portions remote from the respective spaced apart ends.

A brake shoe according to this second embodiment preferably is of T-shaped cross-sectional form throughout substantially its full circumference and the connection means preferably extends in connection with the inwardly depending web of the T-section. The connection to the inwardly depending web may be made by any suitable means and for example, that connection may be made by suitable fasteners such as rivets, or by welded connection. While these means for connection are appropriate, it is however, preferred that the connection means be integrally formed with the brake shoe web and that integral formation can be achieved in a brake shoe that is formed such as by pressing, punching or stamping, or by methods such as laser cutting. Other methods may also be appropriate.

The connecting means may also be connected to the backing plate in any suitable manner and the means of connection discussed above are also appropriate for connection to the backing plate. However again, the connection to the backing plate is also preferably an integral connection. In this respect, it is preferred that the brake shoe, the connection means and the backing plate be formed integrally, such as from a metal plate by a series of processing operations. For example, a metal plate formed as a circular shoe platform may be split through the edge thereof to flare the edge and form a peripheral rim extending perpendicular to the plane of the disc. That rim defines the radial supporting surface for supporting friction lining which may subsequently be applied thereto. The circular disc may thereafter be subjected to operations suitable to displace a section of the disc radially inward of the peripheral rim to form a backing plate and thereby separate the circular shoe portion into a brake shoe portion and backing plate portion. For this, the disc may be pressed, punched or stamped, or it may be machined or cut by a laser. The backing plate preferably is not fully separated from the brake shoe portion of the circular shoe portion, but preferably a connecting portion or portions remain connected between the backing plate and the brake shoe. That portion or portions are formed in such a manner to constitute the connecting means.

As discussed, the connecting means can have any suitable form to provide the required radial, circumferential and return movement between the brake shoe and the backing plate. The shape of the connecting means may however be limited by the type of forming operation used in the construction of the brake assembly and it is envisaged that more complicated forms of connecting means will require more sophisticated forming techniques. Laser cutting for example, is a more time consuming and costly forming operation, but it offers greater diversity in the type of forms that can be cut, say from a disc platform arrangement discussed above.

The connecting means can provide movement in the aforementioned radial and circumferential directions in a purely resilient or elastic manner, so that the brake assembly recovers from any such movement when the forces initiating the movement, such as actuating forces, and braking forces when the brake shoe is expanded against the internal braking surface of a rotating brake drum, are removed. However, in one preferred arrangement the connecting means also provides for plastic movement, so that the brake assembly can be permanently distorted in a manner that correctly and permanently positions the brake shoe in the brake off condition relative to a brake drum.

Plastic distortion of the connecting means may take place during manufacture of the brake assembly when the requirements for plastic distortion are known, or equally, plastic distortion may occur during operation of the brake assembly, such as during first or early actuation of the brake shoe, or progressively in order to compensate for wear of friction lining. Additionally or alternatively, plastic distortion may facilitate proper location of the brake shoe within the brake drum, such as after the backing plate has been fixed to the vehicle. That is, a rigid connection between the brake shoe and the backing plate may incorrectly align the brake shoe relative to the brake drum, so as to diminish the performance of the brake assembly. However, the connecting means may permit self-alignment, such as self-centering, to take place under a permanent distortion thereof in order to permanently correct what otherwise would be a permanent flaw in the brake assembly.

The availability of plastic distortion is required to be selectively available under limited conditions only. That is, it is important that the operation of the brake assembly be predictable, so that a positive running clearance between the friction lining of the assembly and the internal braking surface of a drum brake is maintained when no brake actuating force is applied. Thus, plastic distortion of the connecting means is preferably limited to occur only under controlled conditions.

The connecting means may be so provided that plastic distortion is only available in one of the radial or circumferential directions of brake shoe movement and preferably, plastic distortion is at least available in the radial direction.

The positioning means described above may also include abutment means as described earlier and such abutment means may extend from the backing plate and the connecting means may, in the brake off condition, bring the brake shoe into engagement with the abutment means to positively position the shoe. Other arrangements may also be available.

The positioning means of this embodiment permits the brake assembly to return the brake shoe from contact with the drum braking surface when a brake actuating force has been removed. Additionally the movement permitted by the connecting means enables the brake shoe to be positioned under brake actuation such that the friction lining attached to the brake shoe is presented to the drum braking surface in the most appropriate manner for efficient braking and wear of friction lining. This arrangement is further advantageous because the brake shoe remains self supported on the backing plate. Thus, the arrangement maintains the benefits of a brake assembly in which the brake shoe is attached to the backing plate, but avoids the disadvantages with such an arrangement that relate to brake shoe misalignment.

The attached drawings show example embodiments of the invention of the foregoing kind. The particularity of those drawings and the associated description does not supersede the generality of the preceding broad description of the invention.

BRIEF DESCRIPTION OF THE DRAWINGS

FIGS. 6, 6a and 7 to 9 show examples of abutments suitable for use in a brake assembly according to the invention.

DETAILED EMBODIMENT

Figure 1:
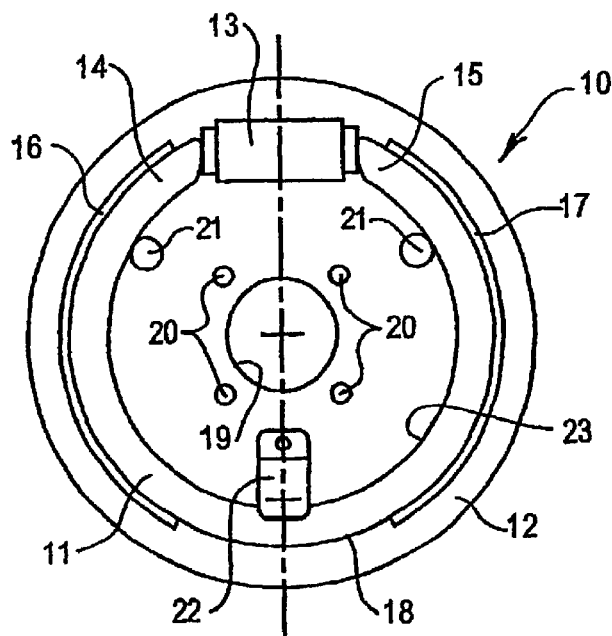
FIG. 1 is a plan view of a brake assembly according to one embodiment of the invention.
Figure 2:
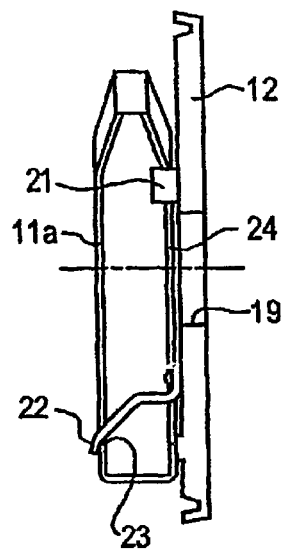
FIG. 2 is a side cross-sectional view through the center line of FIG. 1.
Figure 3:
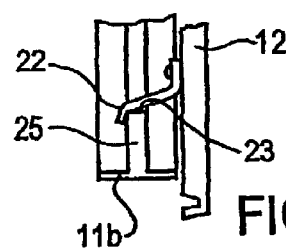
FIG. 3 is a part view of the biasing spring arrangement of FIG. 2.

FIG. 1 is a plan view of a brake assembly 10 according to one embodiment of the invention and illustrates a brake shoe 11 of single-piece generally circular form and a backing plate 12, on which the brake shoe 11 is mounted. The assembly 10 further includes an actuator 13 which, during brake actuation, separates the ends 14 and 15 of the brake shoe 11 to radially expand the shoe and bring the friction lining 16 and 17 attached to the radial outer surface 18 of the brake shoe 11 into contact with the drum braking surface of the brake drum (not shown). The brake shoe 11 can be of T-shaped (11a) or channel shaped (11b) section as shown in the side cross-sectional views of FIGS. 2 and 3.

The backing plate 12 includes a central opening 19 generally for receipt of a stub axle and four further openings 20 for receipt of the wheel bolts. The central opening 19 is required to be accurately positioned and formed, because excessive clearance about the stub axle may cause the assembly 10 to be inaccurately located, so that either of the friction lining 16 or 17 touches the drum in the brake off condition.

Extending proud of the generally planar surface of the backing plate 12, is a pair of abutments 21, disposed symmetrically about a centre-line C extending between the ends 14 and 15 of the brake shoe 11. Also extending from the backing plate 12, is biasing means in the form of a leaf or cantilever spring 22. A shown in FIGS. 2 and 3, the spring 22 engages a radially inwardly directed face or edge 23 of the brake shoe 11 and that engagement occurs regardless of the type of shoe cross-section.

Each of the abutments 21 is of cylindrical or arcuate form where it contacts the shoe and extends to a height sufficient to engage the radially inward edge 23 of the brake shoe 11. The height of the abutments may be different depending on the cross-sectional shape of the brake shoe and for example, in FIG. 2, the abutment 21 extends to a height sufficient to engage the radially inward extending leg 24 which is adjacent the planar surface of the backing plate 12. The abutment 21 shown in FIG. 2 may therefore have a reduced height than necessary to engage the radially inward extending web 25 of the shoe 11b of FIG. 3.

As shown in FIG. 1, the abutments 21 are spaced at an included angle of approximately 120° from the centre of the backing plate 12. That spacing is considered appropriate although it is not essential and the abutments could be positioned elsewhere.

In the FIG. 1 arrangement, the brake shoe 11 is shown in a brake off condition, in which the inner edge 23 of the brake shoe engages the outer periphery of the abutments 21. The ends 14 and 15 are also in engagement with the opposite ends of the actuator 13 and the spring 22 is in engagement with the inner edge 23, By the above described engagement, the brake shoe 11 is positioned so as to provide clearance between the outer face of the friction lining 16 and 17 and the drum braking surface (not shown).

When a brake actuating load is applied to the brake shoe 11 through the actuator 13, the shoe expands radially to engage the friction lining 16 and 17 against the drum braking surface and by that radial expansion the inner edge 23 is disengaged from the abutments 21. In the arrangement illustrated, the spring 22 will remain in contact with the edge 23, although continuation of that contact is not important. Under a brake actuating load, the brake shoe 11 acts as in a known manner, such as that described in U.S. Pat. No. 5,246,093.

It is in return movement of the brake shoe 11 that the positioning means (positioner) influences the position of the shoe 11 within the drum (not shown). Under resilient radial contraction of the brake shoe 11, the edge 23 re-engages the peripheral surface of the abutments 21, while the spring 22 applies a biasing influence downwardly (relative to the orientation of the assembly 10 in FIG. 1). Additionally, there is engagement of the ends 14 and 15 with the actuator 13. The brake shoe 11 is, in the arrangement shown in FIG. 1, constrained against floating movement and thus is accurately positioned on the backing plate against contact between the friction lining 16 and 17 and the drum braking surface.

Figure 4:
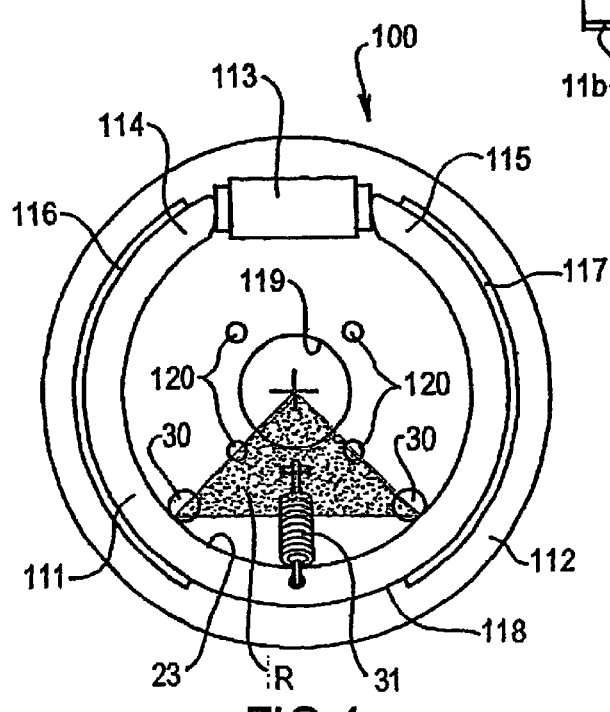
FIG. 4 is a plan view of a brake assembly according to a further embodiment of the invention.
Figure 5:
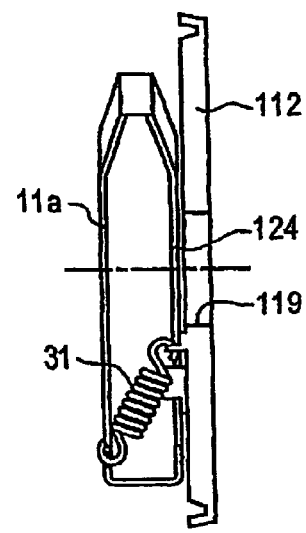
FIG. 5 is a side cross-sectional view through the center line of FIG. 4.

An alternative arrangement is shown in FIGS. 4 and 5. For convenience the same reference numerals already used will be employed for like parts, plus 100. The brake assembly 100 differs from that of FIG. 1 in two respects. Firstly, the assembly 100 includes a pair of abutments 30 of the same kind as that of the assembly 10, but these are spaced further about the inside edge 123 of the brake shoe 111, toward the middle of the shoe. Secondly, the assembly 100 includes a coil spring 31 which is anchored to the backing plate 112 at one end and to the brake shoe 111 at the other end. The coil spring 31 assists to bias the brake shoe 111 into engagement with the abutments 30 in the brake off condition while the radial resilience of the brake shoe further ensures continued engagement between the actuator 113 and the shoe ends 114, 115. By that engagement and by engagement of the shoe ends 114 and 115 with the actuator 11, the brake shoe 111 can be accurately positioned on the backing plate and be restrained against floating. That accurate positioning, like the FIG. 1 embodiment, permits the friction lining 116 and 117 to be spaced from contact with the drum braking surface in the brake off condition.

In FIGS. 6 and 6a, examples of abutments suitable for use in a brake assembly of the invention are shown. Referring to FIG. 6, there is shown an abutment 32 extending from a backing plate 12 of the kind shown in FIG. 1. FIG. 6 also shows a channel-shaped brake shoe 33 in engagement with the abutment 32. The abutment includes a step 34, one surface 35 of which is for supporting the brake shoe 33 away from the backing plate 12 and a second surface 36 for supporting the inner edge of the brake shoe radially.

In FIG. 6a, a similar style of abutment is shown, but the abutment 37 has a greater axial height away from the backing plate 12 than the abutment 32, for supporting the radially inwardly depending web 38 of the brake shoe 39. Otherwise, the abutment 37 also includes a step for supporting the web radially, as well as axially away from the backing plate.

The brake assemblies described above may include means to hold the brake shoe against axial movement away from the backing plate, although in each of the embodiments shown in FIGS. 1 and 4, the springs 22 and 31 have a downward or axial influence to hold the respective brake shoe against the abutment steps and adjacent the respective backing plates.

A further example of a suitable abutment is shown in FIGS. 7 to 9. In these figures, a tubular member 40 is employed in respective openings 41 and 42 in the backing plate 12. Each of the openings 41, 42 is formed at least partly in a raised section 41a, 42a of the backing plate, although the manner in which the member 40 is attached to the backing plate is not important. FIG. 9 represents a plan view of the FIG. 7 arrangement and shows the member 40 as being generally tubular, but with a gap G that extends the full longitudinal extent of the member. The gap G is located in a plane that is generally 90° to the point of engagement between the brake shoe 33 and the member 40 and permits the member 40 to resiliently collapse under a sufficient load exerted by the brake shoe. By resiliently collapsing, the member 40 is able to recover when the load is removed or displaced, so that the brake shoe is returned to its position on the backing plate prior to the load being experienced. The member 40 is preferably made of a spring steel to facilitate resilient collapsibility. The member 40 is intended to collapse only under significant loading and should have sufficient preload not to collapse under the load of the biasing means, such as the biasing spring 31 of FIG. 4.

Figure 10:
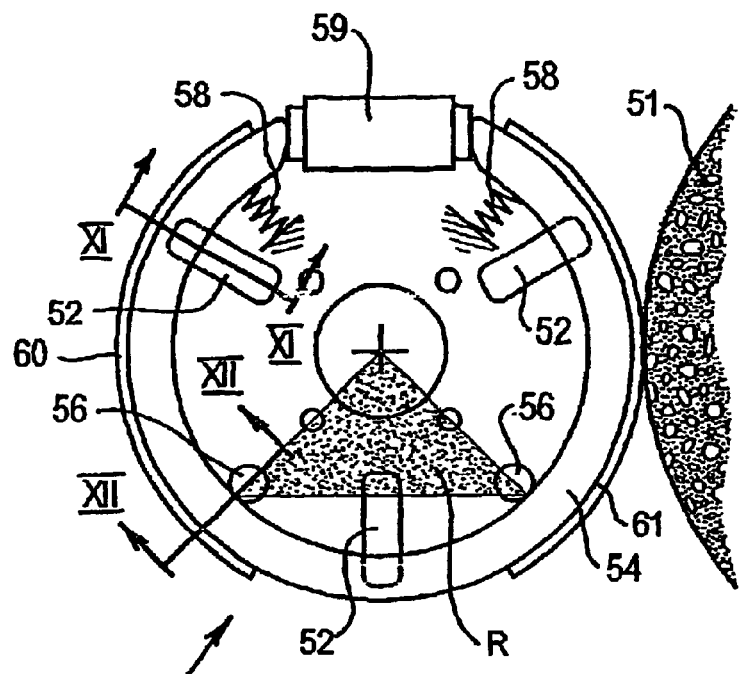
FIG. 10 illustrates schematically a grinding jig for grinding a brake shoe for use in a brake assembly according to the invention.

FIG. 10 illustrates schematically, a grinding jig for grinding a brake shoe for use in a brake assembly according to the invention. The grinding jig 50 includes a grinding wheel 51 and that wheel can be of a known type. The jig 50 further includes three clamping plates 52 spaced substantially equidistantly about the inwardly directed leg 53 (see also FIG. 11). The clamping plates 52 hold the brake shoe 54 against a backing plate 55 of the jig 50.

Figure 11:
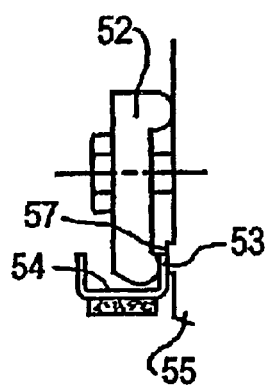
FIG. 11 illustrates clamping plates for use in the grinding jig shown in FIG. 10.
Figure 12:
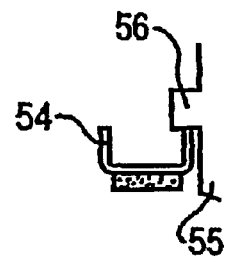
FIG. 12 illustrates an abutment for use in the grinding jig shown in FIG. 10.

The jig 50 further includes a pair of abutments 56 which are positioned in the jig 50 to simulate such abutments as may be provided in a brake assembly according to the invention. An abutment 56 is shown in FIG. 12 and that abutment has a circular periphery, although it could be otherwise shaped. The abutment 56 can, but as shown in FIG. 11, does not have a step for axial support. Instead, because the jig 50 employs clamping plates 52 that clamp the brake shoe 54 against platforms 57 (see FIG. 11) the abutment 56 is not required to provide any axial support. There could be four clamps altogether, two in the region of the gap between the shoe ends, and two close to or adjacent the abutments 56.

As shown schematically in FIG. 10, biasing means (structure) 58 are employed to urge the brake shoe 54 into engagement with the abutments 56. As shown, the biasing means 58 act in compression. When the jig 50 is loaded with a brake shoe the biasing means 58 may be anchored to the backing plate 55 and arranged for contact with the brake shoe 54. This may be arranged in any suitable manner. The jig 50 further includes an abutment 59 to abut the free ends of the brake shoe 54 and to simulate a brake actuator in an "applied" or "as installed" condition.

Location of the brake shoe 54 in the jig 50 is such as to accurately simulate the position of a brake shoe in a brake assembly. Thus, the geometry of the shaded triangular regions R in FIGS. 4 and 10 are arranged to be substantially identical. As stated earlier, it is important that the opening 119 (FIG. 4) be accurately formed and this is preferably achieved by machining.

Having loaded the brake shoe into the jig 50, the grinding wheel may grind the friction lining 60 and 61 to any suitable profile, which does not necessarily have to be the profile of the internal braking surface of the drum.

Figure 13:
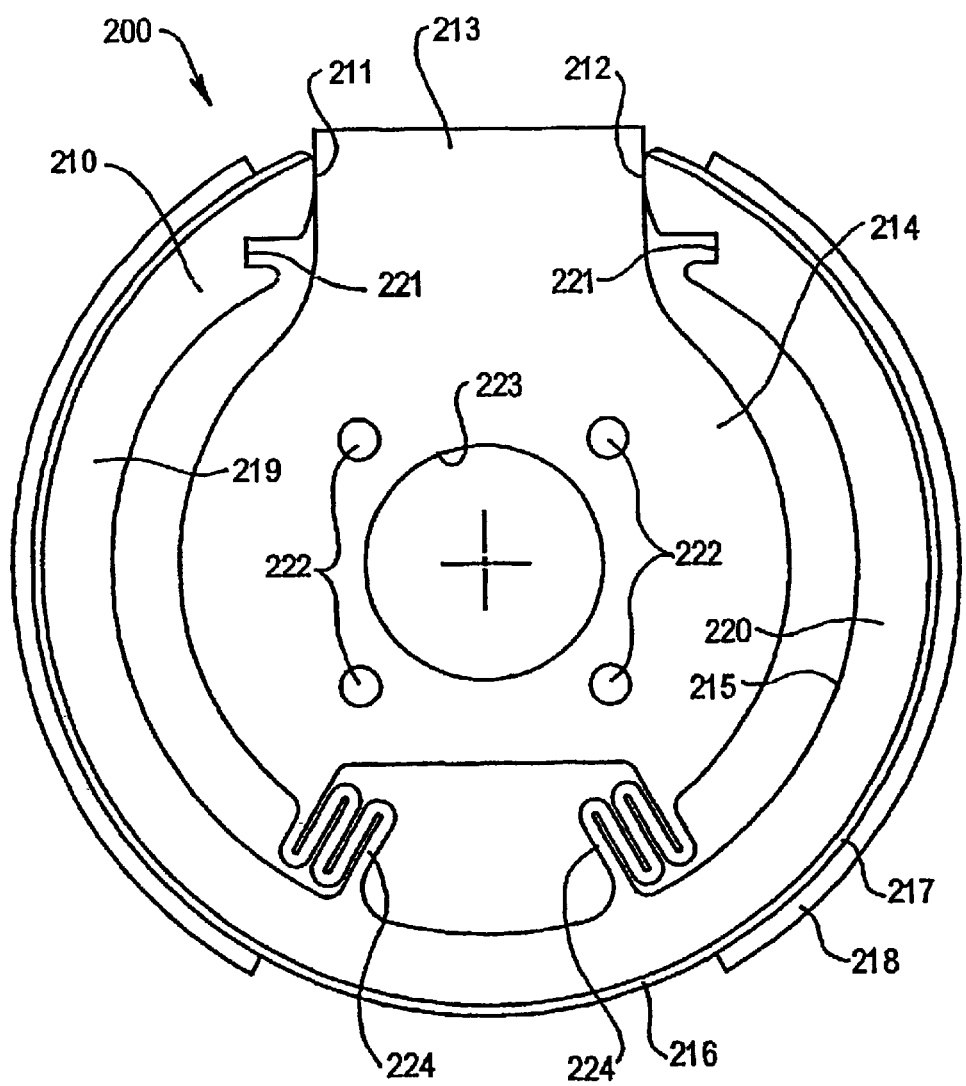
FIG. 13 shows a brake assembly according to a further embodiment of the invention.

FIG. 13 is a plan view of one proposed form of the invention and shows a brake assembly 200 having a brake shoe 210 of single piece, T-shaped cross-sectional construction. As shown, the brake shoe 210 is of a generally circular form and has a pair of opposed ends 211 and 212 which in use, are arranged to abut under braking load, an abutment 213 formed by or on a backing plate 214.

The brake shoe 210 has a similar form to the brake shoe disclosed in the co-pending International application PCT/AU99/00248 filed by the present applicant and includes a radially inward depending web 215 and a rim 216 formed perpendicular to the web 215. The rim 216 defines a radially outer supporting platform 217 for supporting brake friction lining 218. The friction lining 218 may be attached to the platform 217 in any suitable manner, such as by suitable adhesive. The brake shoe 210 includes two sections of friction lining 218 disposed on opposite brake shoe portions 219 and 220. The web 215 of the brake shoe 210 includes notches 221 for receipt and location of an expander or actuator (not shown).

The backing plate 214 is configured for connection to the axle of a vehicle in the normal way and includes openings 222 and 223 for that purpose. These openings can be provided in any suitable manner to suit the particular vehicle to which the backing plate is to be attached.

The brake shoe 210 operates in the normal manner by application of an actuating force to the shoe to cause it to expand radially, thus increasing the gap between opposed ends 211 and 212 and to bring the friction lining 218 into braking engagement with the internal braking surface of a brake drum. The resilience of the brake shoe will cause the shoe to radially contract when the actuating force is released, although retracting assistance may be provided by known means such as coil springs attached between the shoe portions 219 and 220.

The unique feature of the brake assembly 200 is provided by the connecting means 224 connecting the brake shoe to the backing plate 214, which is disposed adjacent either end of each of the brake shoe portions 219 and 220. The connecting means 224 extends from the radially inner edge of the web 215 to the radially outer edge of the backing plate 214 and is formed integral with both the brake shoe 210 and the backing plate 214. The connecting means 224 is formed as a substantially planar, resilient spring that permits movement of the brake shoe 210 both radially and circumferentially relative to the backing plate 214, but with return to a brake off position in which the friction lining 218 is spaced from the drum braking surface. That movement is facilitated by the configuration of the connecting means 224 as shown, although that configuration or arrangement could take other forms and still permit the same movement. For example, a linkage type arrangement could be employed, or a spring arrangement employing a resilient rubber block could be employed.

FIG. 13 shows a brake assembly including connecting means that is designed for elastic deformation to repeatedly return the brake shoe to a set inoperative position when an actuating force to radially expand the brake shoe has been removed. For this, the brake shoe 210 is radially movable under an actuating load to permit radial expansion of the shoe so that the friction lining 218 is brought into braking engagement with the internal braking surface of a drum, and the brake shoe is furthermore circumferentially movable under a braking load to enable one of the opposed ends 211 or 212 of the shoe to engage the abutment 213 and to therefore transfer braking torque to that abutment in the normal manner.

The connecting means may however also be designed for plastic deformation to permit the brake shoe 210 to be positioned accurately and correctly relative to the backing plate 214, when the brake assembly 200 is installed in a drum brake. The design can permit plastic deformation in either or both of the radial and circumferential directions as may be desirable.

The connecting means 224 are separated, preferably by an included angle of between 60° to 120°. The position of the connecting means 224 as shown in FIG. 1 is considered to be most appropriate The brake assembly 200 may be manufactured in any suitable manner, and the arrangement illustrated in FIG. 1 can be formed from a circular disc platform which is edge split to form the rim 216. The disc can then be punched or otherwise treated to separate the brake shoe 210 from the backing plate 214 and also to form the notches 221 and the openings 222 and 223. The punching operation is operative to leave the brake shoe 210 connected to the backing plate 214 for later formation of the connecting means 224 and for that formation of the spring arrangement of the connecting means 224, a flat tab or strip may be left connecting the brake shoe 210 to the backing plate 214. That tab or strip may then be laser cut into the planar spring form shown in FIG. 1. Other methods for this may also be appropriate and are within the scope of the invention. For example, it may be possible that the punching operation formed to separate the brake shoe 210 and the backing plate 214 could also form the connecting means 224. That would be particularly advantageous by eliminating the need for laser cutting and reducing the number of steps necessary to form the brake assembly 200. The connecting means 224 can be formed integrally between the brake shoe 210 and the backing plate 214, such as by the above punching operation, or can be formed separately from one or each of the brake shoe and the backing plate for attachment thereto. Such attachment can be by any suitable means.

The invention described herein is susceptible to variations, modifications and/or additions other than those specifically described and it is to be understood that the invention includes all such variations, modifications and/or additions which fall within the spirit and scope of the above description.

I claim:

1. A drum brake assembly including a rotatable drum having a radially inner braking surface and a resiliently expandable brake shoe of single piece construction and of generally circular form mounted within said drum against a backing plate, said brake shoe having a radially outer face and friction lining mounted thereon in facing relationship to said radially inner braking surface, an actuator having actuated brake on and released brake off conditions and being operable in said actuated condition to diametrically expand said brake shoe, and positioning units for positioning said brake shoe within said drum when said actuator is in said brake off condition and said brake shoe has resiliently contracted, to provide for complete clearance between the outer face of said friction lining and said inner braking surface, said positioning units including at least a pair of spaced apart abutments arranged to abut an internal face or edge of said brake shoe in said brake off condition and which are connected to extend outwardly from said backing plate, a biasing spring extended in connection between said brake shoe and said backing plate and being provided to bias and return said brake shoe from a position in which said internal edge or face of said brake shoe is spaced from said abutments into abutting engagement with said abutments upon release of said actuator from said brake on to said brake off condition.

2. A drum brake assembly according to claim 1, said at least a pair of abutments being spaced apart symmetrically about a center-line that extends between oppose ends of said brake shoe.

3. A drum brake assembly according to claim 1, said abutments projecting outwardly from said backing plate.

4. A drum brake assembly according to claim 3, said abutments being formed integrally with said backing plate.

5. A drum brake assembly according to claim 1, said abutments being arranged to distort resiliently under load causing axle deflection.

6. A drum brake assembly according to claim 5, said abutments being tubular, with a longitudinal gap extending the full lengthwise extent thereof and said abutments being so aligned that said load causing axle deflection causes said gap to close resiliently.

7. A drum brake assembly according to claim 1, said biasing spring comprising a coil spring extending in tension between said brake shoe and said backing plate.

8. A drum brake assembly including a rotatable drum having a radially inner braking surface and a brake shoe of single piece construction and of generally circular form mounted within said drum against a backing plate, said brake shoe having a radially outer face and friction lining mounted thereon in facing relationship to said radially inner braking surface, an actuator having actuated brake on and released brake off conditions and being operable in said actuated condition to diametrically expand said brake shoe, and positioning units for positioning said brake shoe within said drum when said actuator is in said brake off condition to provide for complete clearance between the outer face of said friction lining and said inner braking surface, said positioning units including at least a pair of spaced apart abutments arranged to abut an internal face or edge of said brake shoe in said brake off condition, a biasing spring being provided to bias and return said brake shoe into abutting engagement with said abutments upon release of said actuator from said brake on to said brake off condition, said biasing spring extending in connection between said brake shoe and said backing plate, and said biasing spring comprising at least one of a leaf and cantilever spring fixed to either said brake shoe or said backing plate and arranged to bear against the other.

9. A drum brake assembly including a rotatable drum having a radially inner braking surface and a brake shoe of single piece construction and of generally circular form mounted within said drum against a backing place, said brake shoe having a radially outer face and friction lining mounted thereon in facing relationship to said radially inner braking surface, an actuator having actuated brake on and released brake off conditions and being operable in said actuated condition to diametrically expand said brake shoe, and a positioning arrangement for positioning said brake shoe within said drum when said actuator is in said brake off condition to provide for complete clearance between the outer face of said friction lining and said inner braking surface, said positioning arrangement including connectors connecting said brake shoe to said backing plate, said connectors permitting resilient brake shoe movement both radially and circumferentially as required relative to said backing plate upon said actuator being actuated to diametrically expand said brake shoe to said brake on condition, and to return said brake shoe to a diametrically contracted brake off condition upon release of said actuator to a position of clearance between said inner braking surface of said drum and said outer face of said friction lining, said connectors including a pair of connecting elements spaced apart circumferentially about said brake shoe and being formed in integral connection between said brake shoe and said backing plate.

10. A drum brake assembly according to claim 9, said brake shoe defining a pair of substantially rigid brake shoe portions disposed in facing relationship and each having a T-shaped cross-sectional form along at least a major portion of its length and each defining an outer radial surface for supporting friction lining and a radially inwardly depending web.

11. A drum brake assembly according to claim 10, said brake shoe having a T-shaped cross-sectional form throughout substantially its full circumference and said connectors extending in connection with the radially inwardly depending web of said brake shoe.

12. A drum brake assembly according to claim 10, said shoe portions being spaced apart at opposed ends thereof and said connectors being disposed at or adjacent the respective other ends of said shoe portions.

13. A drum brake assembly according to claim 9, said connectors being plastically deformable to facilitate correct positioning of said brake shoe for clearance between said inner braking surface and said outer face of said friction lining.

14. A drum brake assembly according to claim 13, said connectors being progressively plastically deformable over time so that the clearance between said inner braking surface and said outer face of said friction lining is maintained substantially constant as said friction lining wears.

15. A drum brake assembly including a rotatable drum having a radially inner braking surface and a brake shoe of single piece construction and of generally circular form mounted within said drum against a backing plate, said brake shoe having a radially outer face and friction lining mounted thereon in facing relationship to said radially inner braking surface, an actuator being adapted to provide an actuated brake on condition and a released brake off condition and being operable in said actuated condition to diametrically expand said brake shoe, at least a pair of abutments extending outwardly of the backing plate for stopping radial inward movement of said brake shoe within said drum when said actuator is in said brake off condition to provide for complete clearance between the outer face of said friction lining and said inner braking surface, and a spring engaging the brake shoe to bias the brake shoe against the pair of abutments.

16. A drum brake including a rotatable drum having a radially inner braking surface and a brake shoe of single piece construction and of generally circular form mounted within said drum against a backing plate, said brake shoe having a radially outer face and friction lining mounted thereon in facing relationship to said radially inner braking surface, an actuator having actuated brake on and released brake off conditions and being operable in said actuated condition to diametrically expand said brake shoe, and positioning units for positioning said brake shoe within said drum when said actuator is in said brake off condition to provide for complete clearance between the outer face of said friction lining and said inner braking surface, said positioning units including at least a pair of spaced apart abutments arranged to abut an internal face or edge of said brake shoe in said brake off condition, a biasing spring being provided to bias and return said brake shoe into abutting engagement with said abutments upon release of said actuator from said brake on to said brake off condition, said abutments being tubular, with a longitudinal gap extending the full lengthwise extent thereof and said abutments being so aligned that a load causing axle deflection causes said gap to close resiliently.

17. The drum brake assembly according to claim 16, wherein said abutments are adapted to resiliently distort under load causing axle deflection.

* * * * *